Oct. 15, 1935.         D. PYZEL         2,017,323
PROCESS FOR THE DISTILLATION OF AMMONIA
Original Filed June 7, 1932
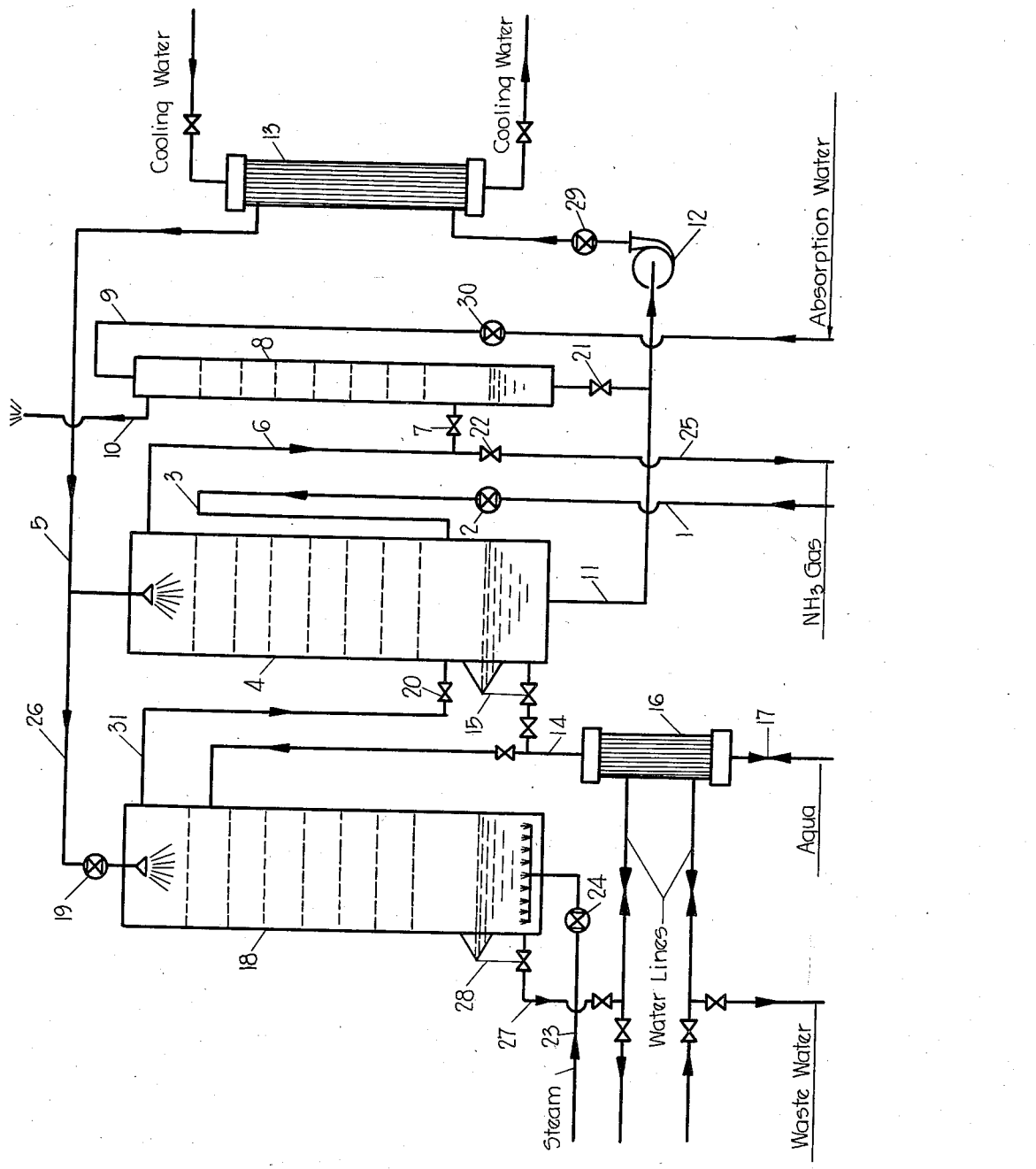
Inventor: Daniel Pyzel
By his Attorney Patented Oct. 15, 1935

2,017,323

UNITED STATES PATENT OFFICE 2,017,323

PROCESS FOR THE DISTILLATION OF AMMONIA

Daniel Pyzel, Piedmont, Calif., assignor to Shell Development Company, San Francisco, Calif., a corporation of Delaware Original application June 7, 1932, Serial No. 615,807. Divided and this application May 7, 1934, Serial No. 724,350. In Canada October 25, 1932

2 Claims. (Cl. 202—67)

This application is a division of my application, Serial No. 615,807 filed in the U. S. Patent Office June 7, 1932.

In plants for the production of ammonia and its products which comprise an ammonia synthesis unit and various units using ammonia as a raw material, economical operation necessitates that suitable means for storing ammonia be provided so that, in case of shut down of either the ammonia producing or ammonia utilizing units for necessary repairs or fluctuating consumption, et cetera, the remaining unit or units can operate for a time without the aid of the other.

Some of the more recent processes for ammonia synthesis produce the ammonia in the gaseous state. This ammonia gas could be stored as liquid anhydrous ammonia but this necessitates liquefying the gas and storing the resultant liquid anhydrous ammonia in pressure vessels. The above method, however, is expensive and cumbersome. The ammonia gas could also be stored as a gas but the space required would be too great.

The easiest method of storing the ammonia gas is to absorb it in water forming aqueous solution of ammonia. This aqueous solution of ammonia can be stored in ordinary storage tanks. The gaseous ammonia can be readily obtained again when required by distillation of the aqueous solution of ammonia.

It is a purpose of this invention to devise a process for the production of gaseous ammonia from aqueous solution of ammonia.

It is a further purpose of this invention to provide a process and apparatus suitable for the alternative formation of aqueous solution of ammonia from pure ammonia and the formation of gaseous ammonia from aqueous solution of ammonia.

The further objects and advantages of my invention will be more fully understood from the following detailed description throughout which reference is made to the accompanying drawing which shows a typical arrangement of my apparatus. In this description it should be understood that although the terms "tower", "bubble column" and "stripper" are each used for certain parts of the apparatus, such use is solely for the sake of clearness of description as various types of towers or columns can be used at these points.

In operating so as to form aqueous solution of ammonia, ammonia gas is conducted into the apparatus through line 1. This gas, after passing through a suitable control valve 2, passes by way of inverted U 3 into the lower portion of tower 4. Aqueous solution of ammonia of medium strength (for example concentrations of from 5% to 20% ammonia in water depending upon the concentration desired in the final product) is sprayed into the top of this tower from line 5. The major part of the ammonia entering the tower is absorbed by the medium strength aqueous solution of ammonia flowing down through the tower. The resulting strong aqueous solution of ammonia collects in the bottom of the tower.

The presence of non-condensible gases such as hydrogen, nitrogen, et cetera, in the ammonia gas will prevent the complete absorption of ammonia in tower 4. The unabsorbed ammonia and non-condensible gases are led off from the top of tower 4 through pipe 6 and valves 7 into the lower portion of a scrubber 8. The gas mixture passes upward countercurrent to water sprayed into the scrubber from line 9 controlled by valve 30. The gases not absorbed are vented to the atmosphere through pipe 10.

Strong aqueous solution of ammonia collects in the bottom of tower 4 and is withdrawn through pipe 11 and forced by means of pump 12 through cooler 13. The cooled aqueous solution of ammonia is passed into line 5 and sprayed into the top of tower 4 as above-mentioned. The dilute aqueous solution of ammonia collecting in the bottom of the scrubber 8 also flows into line 11 and is mixed with the strong aqueous solution of ammonia circulating stream.

In this manner the required quantity of water for absorption first serves to scrub the outgoing non-condensible gases and thereafter takes up its full quota of ammonia gas while flowing down through the tower 4 intermixed with the circulating solution which serves to carry off the heat of absorption.

Strong aqueous solution of ammonia is continually withdrawn from the bottom of tower 4 through pipe 14. The amount of aqueous solution of ammonia withdrawn is regulated by means of a float valve indicated at 15. The aqueous solution of ammonia drawn off is cooled by being passed through heat exchanger 16 countercurrent to cooling water and is then run to storage through line 17.

The concentration of the aqueous solution of ammonia produced is regulated by controlling the temperature in the bottom of the tower 4. This temperature control is in turn effected by regulating the rate of flow of the circulating stream which can be accomplished by valve 29. If the top of tower 4 is kept as cool as possible it will prevent too large a quantity of ammonia from being carried over into the scrubber 8 by the non-condensible gases.

When it is desired to obtain gaseous ammonia from aqueous solution of ammonia, the equipment is augmented by a bubble column 18 by opening valves 19 and 20. The scrubber 8 is cut off from the system by closing valves 7 and 21, and opening valve 22. The process then operates as follows:

The aqueous solution of ammonia is pumped from storage through line 17 into heat exchanger 16 where it is heated by being passed countercurrent to hot water leaving the bubble column 18. The heated aqueous solution of ammonia passes into the upper portion of the bubble column 18 while at the same time steam is injected into the bottom of the bubble column through line 23 controlled by a valve 24. The steam passing upward through the column heats the aqua ammonia flowing downward causing ammonia gas together with some water vapor to be driven off. This gas-vapor mixture flows from the bubble column through line 31 into the bottom section of tower 4.

The ammonia gas and water vapor passing upward through the tower 4 is cooled by a downward flowing stream of cold aqueous solution of ammonia. By this step the major part of the water vapor and some of the ammonia are condensed so that the ammonia gas leaving tower 4 through line 6 and valve 22 is substantially free from water vapor. The ammonia gas is carried through pipe 25 to ammonia consuming units. The cooling in tower 4 is accomplished by means of a rapidly circulating stream of aqua ammonia which is withdrawn from the bottom of tower 4 pumped through cooler 13 and sprayed into the top of the tower from pipe 5. Parts of the cooled aqueous solution of ammonia is led from line 5 into the top of bubble column 18 through line 26 controlled by valve 19. The aqueous solution of ammonia thus sprayed into the bubble column serves as reflux material.

The water entering the system as aqueous solution of ammonia, freed from its contained ammonia gas in the bubble column 18, collects in the bottom of the column. This hot water is continually withdrawn through line 27 and passed through heat exchanger 16 where it gives up most of its heat content to the fresh aqueous solution of ammonia entering the system. The level of the water in the bottom of the column is controlled by means of a suitable float valve 28. At least sufficient steam is injected into bubble column 18 through line 23 to maintain the water collecting in the bottom of the column at its boiling point.

One of the chief advantages of my invention is that the apparatus provides a means for either distillation or absorption processes utilizing a minimum of equipment.

Another advantage is that the system of indirect cooling by a circulating stream of aqueous solution of ammonia, when distilling serves to cool the ammonia gas, and to produce a condensate suitable for reflux. When absorbing, the circulating stream of aqueous solution of ammonia serves to remove the heat of reaction of the ammonia gas and the water. My process is also particularly suitable for large scale production of ammonia from aqueous solution of ammonia or the reverse process.

The further advantages of my invention will be apparent to those skilled in the art.

I claim as my invention:

1. In a process for the preparation of gaseous ammonia from an aqueous solution of ammonia the steps comprising contacting an aqueous solution of ammonia with steam in a tower, withdrawing the ammonia gas and water vapor produced, passing said ammonia gas and water vapor in a second tower countercurrent to a cold aqueous solution of ammonia having a substantially limited capacity for the further adsorption of ammonia, withdrawing a hot aqueous solution of ammonia from the bottom of said second tower, cooling the same and injecting part of the cooled aqueous solution of ammonia into the upper portion of said first tower, and part into the upper portion of said second tower, while withdrawing gaseous ammonia from the upper portion of the second tower.

2. In a process for the preparation of gaseous ammonia from an aqueous solution of ammonia the steps comprising passing an aqueous solution of ammonia countercurrent to steam in a tower, withdrawing the ammonia gas and water vapor produced, passing said ammonia gas and water vapor countercurrent to a cold aqueous solution of ammonia having a substantially limited capacity for the further absorption of ammonia, withdrawing a hot aqueous solution of ammonia from the bottom of said second tower, cooling the same, injecting part of the cooled aqueous solution of ammonia into the upper portion of said first tower and part into the upper portion of said second tower, withdrawing gaseous ammonia from the upper portion of the second tower and withdrawing water from the bottom of the first tower.

DANIEL PYZEL.